United States Patent [19]

Chung

[11] Patent Number: 4,487,913

[45] Date of Patent: Dec. 11, 1984

[54] FUEL AND HYDROLYSIS RESISTANT POLYURETHANE

[75] Inventor: Daniel A. Chung, North Canton, Ohio

[73] Assignee: Goodyear Aerospace Corporation, Akron, Ohio

[21] Appl. No.: 588,598

[22] Filed: Mar. 12, 1984

[51] Int. Cl.³ ............................................. C08G 18/42
[52] U.S. Cl. ...................................... 528/83; 525/437; 525/440; 528/48; 528/64; 528/288
[58] Field of Search .................. 525/437, 440; 528/48, 528/64, 83, 288

[56] References Cited

U.S. PATENT DOCUMENTS 4,235,730 11/1980 Schlicht ............................ 528/83 X
4,247,678 1/1981 Chung ................................ 528/83

Primary Examiner—Lucille M. Phynes
Attorney, Agent, or Firm—P. E. Milliken; D. J. Hudak; L. A. Germain

[57] ABSTRACT

A polyester polyurethane compound is formed by reacting trans-1,4-cyclohexanediisocyanate with a mixed polyester. The mixed polyester can be the copolymerization condensation product of an aliphatic dicarboxylic acid or an aromatic dicarboxylic acid, or a separate physical blend thereof reacted with a polyol. The polyurethane can also contain small amounts of non-extractable epoxies and carbodiimides. The urethane has very good hydrolytic stability in comparison with prior art polyurethane systems and also very good fuel resistance and anti-icing resistance. A preferred area of use is an aircraft fuel tanks and anti-icing components.

20 Claims, No Drawings

FUEL AND HYDROLYSIS RESISTANT POLYURETHANE

TECHNICAL FIELD

The present invention relates to the utilization of a specific diisocyanate in the preparation of polyester type polyurethanes having good fuel and hydrolysis resistance.

BACKGROUND ART

Heretofore, various polyurethanes have been formulated.

A particular urethane polymer is set forth in my prior U.S Pat. No. 4,247,678. This patented polyurethane formulation possesses significantly better hydrolytic stability than all previous polyurethane systems utilized with regard to fuel containers. My prior patent was based on an aliphatic diisocyanate, methylene bis(4-isocyanatocyclohexane) (Mobay Chemical Company's Desmodur W). While having good hydrolytic resistance, my prior polyurethane only had fair fuel resistance and was therefore often utilized in laminate form with other materials to provide good fuel resistance. My present invention is readily distinguished therefrom by possessing unexpected and very good fuel resistance as well as anti-icing properties.

U.S. Pat. No. 4,036,906 to Finelli relates to polyester urethanes which are different from my present invention.

U.S. Pat. No. 4,107,228 to Horowitz et al merely relates to the application of polyurethane via brushing or spraying and hence is not pertinent.

DISCLOSURE OF INVENTION

It is therefore an aspect of the present invention to provide a polyurethane made from trans-1,4-cyclohexanediisocyanate.

It is yet another aspect of the present invention to provide a polyurethane, as above, containing various non-extractable epoxies therein.

It is a further aspect of the present invention to provide a polyurethane, as above, containing various carbodiimides therein.

It is a still further aspect of the present invention to provide a polyurethane, as above, which has excellent fuel, hydrolysis, anti-icing fluid, and low temperature properties.

These and other aspects of the present invention will become apparent by reference to the following application.

In general, a polyester polyurethane, comprises: the reaction product of trans-1,4-cyclohexanediisocyanate or one or more 1 to 8 carbon atom alkyl substituted trans-1,4-cyclohexanediisocyanate and a mixed polyester, said mixed polyester being (a) a copolymerization condensation product of a glycol with at least two dicarboxylic acids selected from the group consisting of an aliphatic dicarboxylic acid, a cycloaliphatic dicarboxylic acid, and an aromatic dicarboxylic acid or (b) a blend of at least two polyesters selected from the group consisting of an aliphatic polyester, a cycloaliphatic polyester and an aromatic polyester, said aliphatic polyester made from the reaction of an aliphatic dicarboxylic acid and a glycol, said cycloaliphatic polyester made from the reaction of a cycloaliphatic dicarboxylic acid and a glycol, said aromatic polyester made from the reaction of an aromatic dicarboxylic acid and a glycol, said aliphatic dicarboxylic acid having from 2 to 12 carbon atoms, said cycloaliphatic dicarboxylic acid having from 7 to 15 carbon atoms, said aromatic dicarboxylic acid having from 8 to 12 carbon atoms, said polyol having a molecular weight of 500 or less, the amount of said aliphatic dicarboxylic acid and said cycloaliphatic dicarboxylic acid based upon the total amount of said dicarboxylic acids ranging from about 90 percent to about 10 percent by weight.

The molecular weight of said polyester made from said dicarboxylic acids and said polyol ranging from about 500 to about 4,000 and wherein the equivalent ratio of said isocyanate to the OH end groups in said polyester ranges from about 1.5 to about 3.0.

BEST MODE FOR CARRYING OUT THE INVENTION

The polyurethane of the present invention can be utilized in various products including fuel cells for aircraft requiring very good hydrolytic and fuel resistance. To achieve these properties, a urethane prepolymer is made utilizing trans-1,4-cyclohexanediisocyanate, as for example manufactured by Armak Co. of Chicago, and reacted with a polyester. The polyester can be derived from the co-condensation reaction of a glycol with at least two dicarboxylic acids such as an aliphatic dicarboxylic acid, a cycloaliphatic dicarboxylic acid, or an aromatic acid. Alternatively, the polyester can be derived from a blend of polyester such as an aliphatic polyester, a cycloaliphatic polyester, or an aromatic polyester. Such polyesters are made from the reaction of a glycol with the corresponding dicarboxylic acid. The specific diisocyanate of the present invention can have one or more alkyl substituted groups thereon having from 1 to 8 carbon atoms. However the unsubstituted diisocyanate is preferred.

Suitable polyols include those having a molecular weight of 500 or less, or desirably 200 or less. Preferably, the polyol is a glycol containing at least 2 carbon atoms as from 2 to about 10 carbon atoms, with from about 4 to about 6 being desired. Examples of specific glycols include 1,6-hexane diol, 1,4-butane diol, neopentyl glycol, ethylene glycol, and the like. The various hexane diols are preferred.

The aliphatic dicarboxylic acids such as the alkyl dicarboxylic acids generally contain from about 2 to about 12 carbon atoms and preferably from about 6 to about 9 carbon atoms. Specific examples include glutaric acid, adipic acid, and pimelic acid, with azelaic acid being preferred.

Cycloaliphatic dicarboxylic acids can also be utilized such as the cycloalkyl dicarboxylic acids having from 7 to 15 carbon atoms, e.g. cyclohexane dicarboxylic acid, and the like. Similarly, the aromatic dicarboxylic acids and alkyl substituted aromatic acids can contain from 8 to about 12 carbon atoms with 8 carbon atoms being preferred. Examples of such acids include terephthalic acid, phthalic acid, naphthalene dicarboxylic acid, and the like, with isophthalic acid being preferred. The amount of the aliphatic dicarboxylic acids based upon the total weight of the acids in either the copolymerization condensation reaction or in the physical mixture varies from 10 to 90 percent by weight. The polyester is formed by the reaction of the acids and the glycol according to any conventional process and generally has a molecular weight of from about 500 to about 4,000, with from about 1,000 to about 3,000 being preferred. The ratio of the equivalent amount of isocyanate used to the equivalent amount of hydroxy end groups in the polyester ranges from about 1.5 to about 3.0 and preferably from about 1.8 to about 2.2.

Any conventional solvent can be utilized to dissolve the urethane polymer or prepolymer. Specific examples include aromatic compounds having from 6 to 10 carbon atoms and aliphatic compounds, preferably alkyl substituted compounds having from 3 to 8 carbon atoms. Examples of aromatic solvents include xylene, toluene, benzene, and the like, whereas examples of aliphatic compounds include methyl ethyl ketone, methyl isobutyl ketone, and the like. An amount of solvent is utilized such that the amount of urethane solids in the polymer component ranges from about 60 to about 85 percent desirably from about 60 to about 75 percent, and optimally from about 70 to about 75 percent by weight.

The cure component comprises an amine curing agent, usually in a solvent. Generally, any conventional amine curing agent, can be utilized such as alkyl diamines containing from 2 to 20 carbon atoms, cycloalkyl diamines containing from 4 to 20 carbon atoms, and aromatic or alkyl substituted aromatic diamine having from 6 to 20 carbon atoms. Examples of specific diamine curing agents include propylenediamine, 1,4-cyclohexane-bis(methylamine), and phenylenediamine. A preferred diamine compound is methylenedianiline (MDA). Specific examples of other diamines include $H_{12}$ MDA, that is Bis(4-aminocyclohexyl) methane; 1,3-BAC,, that is 1,3-bis(aminomethyl)cyclohexane, ethylene diamine, hexamethylene diamine, 2,4-diethyl-6-methyl-1,3-phenylene diamine, trimethylene glycol di-para-aminobenzoate, meta- or para-xylylenediamine, toluenediamine, trimethylene glycol bis benzoate), 4,4'-methylene bis(orthochloroanaline) (MOCA), isophoronediamine (IPDA) and meta-phenylenediamine (MPD).

The curing agent is dissolved in any conventional solvent such as the same solvents utilized with the urethane polymer or prepolymer, for example, an aromatic or an aliphatic. Examples of specific solvents include methyl ethyl ketone, methyl isobutyl ketone, toluene, and the like. The amount of solvent is such that the amount of solid diamine contained therein generally ranges from about 5 to about 50 percent by weight, desirably from about 10 to about 30 percent, and optimally about 13 to about 20 percent by weight. The amount of diamine when combined with the polyurethane is such that the equivalent ratio of diamine to diisocyanate ranges from about 0.8 to about 1.2, desirably from 0.9 to about 0.95, and optimally about 0.93.

Inasmuch as the overall polyurethane formulation is generally based upon 100 parts by weight of the urethane polymer, the amount of the urethane solvent can be readily calculated therefrom. Similarly, the amount of diamine can readily be calculated by the equivalent ratio of diisocyanate to diamine. Hence, the amount of diamine solvent can also readily be determined.

It has been found that various epoxies can be utilized in the master batch as an additive in that they also improve hydrolytic stability. Generally, the epoxies have an epoxy equivalent weight of from about 500 to about 2000, with from about 800 to about 1200 being preferred. Non-extractable epoxies are desired, that is, epoxies which have little or nil solubility in aviation fuel and the like. By little solubility it is meant a solubility of less than 5 parts of dissolved epoxy per 100 parts by weight of said fuel, desirably less than 1.0 part, and more desirably, less than 0.5 parts. Preferably the epoxy is insoluble in the fuel. Examples of specific epoxy resins include Epon 1001, manufactured by the Shell Chemical Company. Generally, this epoxy is 4,4'-isopropylidenediphenolepichlorohydrin. Another suitable epoxy is D.E.R. 732, manufactured by the Dow Chemical Company. This epoxy is an epichlorohydrin-polyglycol reaction product. A suitable class of non-extractable epoxies are the diglycidyl ethers of Bis-phenol A. The amount of epoxy in the overall final polyurethane formulation ranges from about 2 to about 10 and desirably from about 3 to about 6, based upon 100 parts by weight of the urethane polymer.

Another compound which is desirably utilized in the polyurethane of the present invention are various carbodiimides either in the form of a monomer or polymer. The monomer has the formula

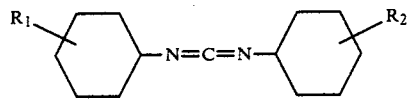

where $R_1$ and $R_2$ can be the same or different, and where $R_1$ and $R_2$ is an alkyl having from 1 to 8 carbon atoms with from 1 to 4 carbon atoms preferred. When a polymer, the molecular weight thereof, is generally from about 300 to about 1200.

An example of a carbodiimide includes the various compounds made by the Mobay Chemical company under the name of Stabaxol. Desirably, an amount of from about 0.2 to about 3.0 and preferably from about 0.5 to about 1.0 parts by weight are preferred, based upon 100 parts by weight of said urethane polymer. These compounds are desirable in that it has been found that they help impart better hydrolytic resistant properties to the overall polyurethane composition.

If desired, various common or conventional polyurethane additives may also be utilized such as colorants, that is pigments such as titanium dioxide, carbon black, etc. or dyes, and the like. When a colorant is utilized, various multiple polyurethane layers can be utilized with a layer having a contrasting color applied to a previous layer to be sure that all parts of a coated object, for example a fuel tank, is covered.

The preparation of the polyurethane composition is generally in a conventional manner. That is, a prepolymer formulation is made containing the particular diisocyanate compound of the present invention and the polyester polymer neat (100% solids) or in a suitable common solvent. Next, an amount of diamine in accordance with the present invention is added along with other additives such as an epoxy, a carbodiimide, and the like.

The mixed composition is then applied in a suitable manner to make a desired object or article. Upon application of the polyurethane composition, the various solvents will tend to evaporate and the diamine curing agent reacts with the prepolymer to produce a cured polyurethane formulation. Although cure can be at ambient temperature, that is for example at about 18° C., generally heat is applied to speed the curing operation. Cure thus occurs from about ambient temperature to about 82° C. and preferably from about 60° C. to about 71° C. Although cure can occur at higher temperature, generally a porous article is produced. Naturally, any desired thickness can be produced and any number of layers can be generated.

In forming the polyurethane, a polycaprolactone can be utilized in combination with the polyester, i.e. in addition thereto. That is, from about 10 to about 90 parts by weight of said polycaprolactone can be utilized based upon 100 parts by weight of said polycaprolactone and the polyester compound. Whenever the polycaprolactone is utilized, the polyester is made from an aliphatic glycol and an aromatic dicarboxylic acid, such as those set forth above. The molecular weight of the polycaprolactone is generally from about 300 to about 800 with from about 450 to about 550 being preferred. During the reaction, the diisocyanate compound reacts with both the polycaprolactone as well as the polyester compound. Generally, when polycaprolactone is utilized, it is used to make a specific layer in a laminate having two or more layers. For example, the laminate can have three layers with one of the layers being a polyester polyurethane of the present invention and having said polycaprolactone as an ingredient thereof. It has been found that utilization of the polycaprolactone as a blend with the polyester results in a noticeable improvement with regard to barrier resistance, such as fuel resistance, and the like.

The polyurethane composition of the present invention can generally be utilized wherever very good fuel resistance and hydrolytic stability is desired. It is also favored for anti-icing applications. Hence, the polyurethane composition can be utilized as a fuel tank for any vehicle, for example, a jet aircraft, an automobile, truck, marine applications, and the like. With regard to an aircraft, it can be directly applied to any body configurations or within the wings, that is applied directly to any cavity, etc. and not formed into a separate fuel cell. Such will add additional fuel capacity to the aircraft and thereby extend its range. The article or layer can be sprayed, brushed on, dip-coated, or the like. Moreover, when cast, it can be utilized as a 100 percent solid system, that is having no solvent therein. Another use is as a coating upon various aircraft components for utilization as an anti-icing member. The polyurethane composition of the present invention can also be utilized as in a laminate.

For example, it can form either an interior layer or exterior layer and thereby provide fuel resistance, good abrasion resistance, and the like, with the other layers supplementing the particular requirement. A specific laminate is as a three part laminate with only the colors of the various layers being changed. Another specific layer utilizes a polyurethane made from said polycaprolactone in combination with said polyester and having fabric on either side thereof. Attached to each fabric layer can be applied another polyurethane layer.

The present invention will be better understood by reference to the following examples.

A prepolymer "A" having the formulation set forth in Table I was made.

TABLE I

| PREPARATION OF PREPOLYMER A | |
|---|---|
| | Parts by Weight |
| Polyhexamethylene Isophthalate/ Azelate @ 1:1 mole ratio (MW 1980) | 100 |
| Trans-1,4-cyclohexane diisocyanate | 16.8 |

TABLE I-continued

| PREPARATION OF PREPOLYMER A | |
|---|---|
| | Parts by Weight |
| % NCO of 40% prepolymer in MEK: | 1.46 |
| Experimental: | 1.31 |

A cure formulation was then made by adding various diamine curing agents, various carbodiimide compounds, as well as a master batch composition, as set forth in Table II. The master batch contained Modaflow, a leveling agent, manufactured by the Monsanto Industrial Chemicals Company, an epoxy compound, as well as a solvent.

TABLE II

| CURING OF PREPOLYMER A | | | | | |
|---|---|---|---|---|---|
| Cure Formulation | 1 | 2 | 3 | 4 | 5 |
| 40% prepolymer A in MEK, pbw | 150 | 150 | 150 | 150 | 150 |
| 30% MDA/MEK, pbw | 13.9 | — | — | — | — |
| 20% IPDA/MIBK/MEK @ 1/3/1, pbw | — | 17.9 | — | — | — |
| 30% MPD/MEK, pbw | — | — | 7.58 | 7.58 | 7.58 |
| 10% Stabaxol P/Toluene, pbw | — | — | — | 7.5 | — |
| 10% Stabaxol M/MEK, pbw | — | — | — | — | 7.5 |
| Masterbatch a*, pbw | 30.0 | 30.0 | 30.0 | 30.0 | 30.0 |

*Masterbatch, a composition:
Modaflow, pbw 1.25
80% EPON 1001/MEK, pbw 6.25
MEK, pbw 92.50

After briefly mixing, the formulation of Table II was poured into a teflon coated slab mold to make film and cured at approximately 25°–100° C. Strips of approximately 13 cm by 150 cm were then cut. The strips were then tested with regard to hydrolysis resistance and the results are set forth in Table III. Additionally, dumbbells having a width of 6.40 mm were tested with regard to fuel resistance, anti-icing, fluid resistance, as well as low temperature resistance. These results are set forth in Table IV.

TABLE III

| HYDROLYSIS RESISTANCE OF CHDI FILMS* | | | | | |
|---|---|---|---|---|---|
| Cure Formulation | 1 | 2 | 3 | 4 | 5 |
| Original | | | | | |
| 100% Modulus, kg/cm$^2$ | 70 | 51 | 70 | 70 | 65 |
| 300% Modulus, kg/cm$^2$ | 126 | 141 | 119 | 112 | 112 |
| Ult. Tensile, kg/cm$^2$ | 239 | 330 | 232 | 218 | 260 |
| Ult. Elongation, % | 500 | 410 | 460 | 500 | 510 |
| After 60 days/H$_2$O/70° C. | | | | | |
| 100% Modulus, kg/cm$^2$ | | 48 | | | 68 |
| 300% Modulus, kg/cm$^2$ | | 126 | | | 148 |
| Ult. Tensile, kg/cm$^2$ | | 387 | | | 429 |
| Ult. Elongation, % | | 440 | | | 450 |
| After 90 days/H$_2$O/70° C. | | | | | |
| 100% Modulus, kg/cm$^2$ | | 47 | 70 | | 65 |
| 300% Modulus, kg/cm$^2$ | | 134 | 162 | | 148 |
| Ult. Tensile, kg/cm$^2$ | | 373 | 380 | | 415 |
| Ult. Elongation, % | | 430 | 440 | | 450 |
| After 120 days/H$_2$O/70° C. | | | | | |
| 100% Modulus, kg/cm$^2$ | | 53 | 64 | | 65 |
| 300% Modulus, kg/cm$^2$ | | 155 | 141 | | 155 |
| Ult. Tensile, kg/cm$^2$ | | 345 | 267 | | 302 |
| Ult. Elongation, % | | 410 | 420 | | 410 |
| After 11 days in steam | | | | | |
| 100% Modulus, kg/cm$^2$ | 84 | 58 | 77 | 70 | 77 |
| 300% Modulus, kg/cm$^2$ | 155 | 169 | 169 | 176 | 176 |
| Ult. Tensile, kg/cm$^2$ | 309 | 415 | 387 | 330 | 338 |
| Ult. Elongation, % | 460 | 450 | 490 | 400 | 420 |
| After 13 days in steam | | | | | |
| 100% Modulus, kg/cm$^2$ | 77 | 56 | 63 | 70 | 70 |
| 300% Modulus, kg/cm$^2$ | 119 | 126 | 119 | 183 | 134 |
| Ult. Tensile, kg/cm$^2$ | 126 | 239 | 204 | 294 | 211 |

TABLE III-continued

| HYDROLYSIS RESISTANCE OF CHDI FILMS* | | | | | |
|---|---|---|---|---|---|
| Cure Formulation | 1 | 2 | 3 | 4 | 5 |
| Ult. Elongation, % | 340 | 420 | 470 | 460 | 420 |

*T/E data in this table was measured on 1/4" × 6" strips.

TABLE IV

| FUEL, ANTI-ICING FLUID & LOWER TEMPERATURE RESISTANCE OF CHDI FILMS* | | | |
|---|---|---|---|
| Cure Formulation | 2 | 3 | 5 |
| Original | | | |
| Ult. Tensile, kg/cm² | 39.6 | 28.6 | 19.9 |
| Ult. Elongation, % | 460 | 520 | 500 |
| After 72 hrs. in Larmol @ 57° C. | | | |
| Ult. Tensile, kg/cm² | 33.6 | 20.7 | 18.2 |
| Ult. Elongation, % | 550 | 540 | 560 |
| Tensile Retention, % | 85 | 72 | 91 |
| After 72 hrs. in Aq. Anti-icing fluid @ 70° C. | | | |
| Ult. Tensile, kg/cm² | 32.6 | 28.0 | 29.6 |
| Ult. Elongation, % | 500 | 470 | 500 |
| Tensile Retention, % | 82 | 98 | 149 |
| "Masland" Bend Test, C | 27° | 21° | 27° |

*T/E data in this table was measured on 1/4" dumbbells

As apparent from Table III, very good hydrolytic resistance was obtained with regard to all of the formulations. This is especially true with regard to steam heat resistance. As apparent from the data, much better properties were obtained in comparison with my prior polyurethane compound as set forth in U.S. Pat. No. 4,247,678. For example, reference to Table III of U.S. Pat. No. 4,247,678 reveals that with regard to 120 day testing in water, my present compound achieved superior 100 percent modules, 300 percent modulus, as well as ultimate tensile strength. Accordingly, much better hydrolytic values were obtained. With regard to fuel resistance, Table IV indicates that the tensile retention of my compounds were much greater (that is 72–91) in comparison with my prior compound (46–51). Moreover, anti-icing fluid properties were considerably better, that is tensile retention properties of 82–149 percent versus my prior compound of 60–76 percent. Thus, clearly superior and unexpected properties were obtained utilizing trans-1,4-cyclohexane diisocyanate. Such improved properties were clearly unexpected in that the formulation is somewhat similar to the diisocyanate of U.S. Pat. No. 4,247,678.

While in accordance with the patent statutes, a best mode and preferred embodiment has been described, the invention is not limited thereto but rather is limited by the scope of the attached claims.

What is claimed is:

1. A polyester polyurethane, comprising:
    the reaction product of one or more 1 to 8 carbon atom alkyl substituted trans-1,4-cyclohexanediisocyanate or trans-1,4-cyclohexanediisocyanate and
    a mixed polyester, said mixed polyester being (a) a copolymerization condensation product of a glycol with at least two dicarboxylic acids selected from the group consisting of an aliphatic dicarboxylic acid, a cycloaliphatic dicarboxylic acid, and an aromatic dicarboxylic acid, or, (b) a blend of at least two polyesters selected from the group consisting of an aliphatic polyester, a cycloaliphatic polyester, and an aromatic polyester, said aliphatic polyester made from the reaction of an aliphatic dicarboxylic acid and a glycol, a cycloaliphatic polyester made from the reaction of a cycloaliphatic dicarboxylic and a glycol, said aromatic polyester made from the reaction of an aromatic dicarboxylic acid and a glycol,
    said aliphatic dicarboxylic acid having from 2 to 12 carbon atoms, said cycloaliphatic dicarboxylic acid having from 7 to 15 carbon atoms, said aromatic dicarboxylic acid having from 8 to 12 carbon atoms, said polyol having a molecular weight of 500 or less, the amount of said aliphatic dicarboxylic acid and said cycloaliphatic aliphatic acid based upon the total amount of said dicarboxylic acids ranging from about 90 percent to about 10 percent by weight,
    the molecular weight of said polyester made from said dicarboxylic acids and said polyol ranging from about 500 to about 4,000 and wherein the equivalent ratio of said isocyanate to the OH end groups in said polyester ranges from about 1.5 to about 3.0.

2. A polyester polyurethane according to claim 1, wherein said polyurethane is cured with diamine curing agents having from 2 to 20 carbon atoms, and wherein the equivalent ratio of said diamine to said polyisocyanate ranges from about 0.8 to about 1.2.

3. A polyester polyurethane according to claim 2, wherein said aliphatic acid has from 6 to 9 carbon atoms, wherein said polyol has from 4 to about 6 carbon atoms, wherein said diamine curing agent is selected from the group consisting of alkyl diamines having from 2 to 20 carbon atoms, cycloalkyl diamines having from 4 to 20 carbon atoms, and aromatic or alkyl substituted aromatic diamines having from 6 to 20, carbon atoms, and wherein said diisocyanate is said trans-1,4-cyclohexanediisocyanate.

4. A polyester polyurethane according to claim 3, wherein the molecular weight of said polyol is 200 or less, wherein said polyol is a glycol having from 2 to 10 carbon atoms, wherein the molecular weight of said polyester is from about 1,000 to about 3,000, wherein said equivalent polyisocyanate OH ratio is from about 1.8 to about 2.2, wherein the equivalent ratio of said diamine to said polyisocyanate is from about 0.9 to about 0.95, and wherein said dicarboxylic acid is a mixture of an aliphatic acid and an aromatic acid.

5. A polyester polyurethane according to claim 4, wherein said polyol is hexane diol, wherein said aliphatic acid is azelaic acid, wherein said aromatic acid is isophthalic acid.

6. A polyester polyurethane according to claim 3, including from about 2 to about 10 parts by weight of a non-extractable epoxy compound based upon 100 parts by weight of said polyurethane, the equivalent weight of said epoxy ranging from about 300 to about 1,500.

7. A polyester polyurethane according to claim 6, including from about 0.2 to about 3.0 parts by weight of a carbodiimide compound based upon 100 parts by weight of said polyurethane.

8. A polyester polyurethane according to claim 7, including with said polyester from about 10 percent to about 90 percent by weight of a polycaprolactone based upon 100 parts by weight of said polycaprolactone and said polyester, the molecular weight of said polycaprolactone ranging from about 300 to 800, and wherein said polyester is the reaction product of said aliphatic glycol and said aromatic dicarboxylic acid.

9. A polyester polyurethane according to claim 5, including from about 2 to about 10 parts of an epoxy compound based upon 100 parts by weight of said polyurethane, the equivalent weight of said epoxy ranging from about 300 to about 1,500, from about 0.2 to about 3.0 parts by weight of a carbodiimide compound based upon 100 parts by weight of said polyurethane.

10. A polyester polyurethane according to claim 9, including with said polyester from about 10 percent to about 90 percent by weight of a polycaprolactone based upon 100 parts by weight of said polycaprolactone and said polyester, the molecular weight of said polycaprolactone ranging from about 300 to 800, and wherein said polester is the reaction product of said aliphatic glycol and said aromatic dicarboxylic acid.

11. A polyester polyurethane according to claim 3, wherein said polyester polyurethane is in the form of a fuel tank.

12. A polyester polyurethane according to claim 8, wherein said polyester polyurethane is in the form of a fuel tank.

13. A polyester polyurethane according to claim 9, wherein said polyester polyurethane is in the form of a fuel tank.

14. A polyester polyurethane according to claim 9, wherein said tank is a laminate of said polyester polyurethane and has contrasting color layers therein.

15. A process for making a polyester polyurethane material, comprising the steps of:

reacting trans-1,4-cyclohexanediisocyanate or one or more 1 to 8 carbon atoms alkly substituted trans-1,4-cyclohexanediisocyanate with a mixed polyester, said mixed polyester being (a) a copolymerization condensation product of a glycol with at least two dicarboxylic acids selected from the group consisting of an aliphatic dicarboxylic acid, a cycloaliphatic dicarboxylic acid, and an aromatic dicarboxylic acid, or, (b) a blend of at least two polyesters selected from the group consisting of an aliphatic polyester, a cycloaliphatic polyester, and an aromatic polyester, said aliphatic polyester made from the reaction of an aliphatic dicarboxylic acid and a glycol, said cycloaliphatic polyester made from the reaction of an cycloaliphatic dicarboxylic acid and a glycol, said aromatic polyester made from the reaction of an aromatic dicarboxylic acid and a glycol, said aliphatic dicarboxylic acid having from 2 to 12 carbon atoms, said cycloaliphatic dicarboxylic acid having from 7 to 15 carbon atoms, said aromatic dicarboxylic acid having from 8 to 12 carbon atoms, said polyol having a molecular weight of 500 or less, the amount of said aliphatic dicarboxylic acid and said cycloaliphatic dicarboxylic acid based upon the total amount of said dicarboxylic acids ranging from about 90 percent to about 10 percent by weight, the molecular weight of said polyester made from said dicarboxylic acids and said polyol ranging from about 500 to about 4,000, and wherein the equivalent ratio of said polyisocyanate to said OH end groups in said polyester ranges from about 1.5 to about 3.0.

16. A process according to claim 15, including adding a diamine curing agent and wherein the equivalent ratio of said diamine to said polyisocyanate ranges from about 0.8 to about 1.2.

17. A process according to claim 16, wherein said aliphatic acid has from 6 to 9 carbon atoms, wherein said polyol has from 4 to 6 carbon atoms, wherein said dicarboxylic acid is a mixture of an aliphatic acid and an aromatic acid, wherein said diamine curing agent is selected from the group consisting of alkyl diamines having from 2 to 20 carbon atoms, cycloalkyl diamines having from 4 to 20 carbon atoms, and aromatic or alkyl substituted aromatic diamines having from 6 to 20 carbon atoms, wherein the molecular weight of said polyester is from about 1,000 to about 3,000, wherein said diisocyanate is said trans-1,4-cyclohexanediisocyanate, wherein the molecular weight of said polyol is 200 or less, wherein said polyol is a glycol having from 2 to 10 carbon atoms, wherein said equivalent polyisocyanate-OH ratio is from about 1.8 to about 2.2, and wherein the equivalent ratio of said diamine to said polyisocyanate is from about 0.9 to about 0.95.

18. A process according to claim 17, including adding from about 0.2 to about 3.0 parts by weight of a carbodiimide compound based upon 100 parts by weight of said polyurethane.

19. A process according to claim 18, including adding with said polyester from about 10 percent to about 90 percent by weight of a polycaprolactone based upon 100 parts by weight of said polycaprolactone and said polyester, the molecular weight of said polycaprolactone ranging from about 300 to 800, and wherein said polyester is the reaction product of said aliphatic glycol and said aromatic dicarboxylic acid.

20. A process according to claim 18, including using said polyester polyurethane to make a fuel tank.

* * * * *

UNITED STATES PATENT AND TRADEMARK OFFICE
CERTIFICATE OF CORRECTION

PATENT NO. : 4,487,913

DATED : December 11, 1984

INVENTOR(S) : Daniel A. Chung

It is certified that error appears in the above-identified patent and that said Letters Patent is hereby corrected as shown below:

Column 3, line 37, before "toluenediamine" insert
-- 2,4- or 2,6- --.

Signed and Sealed this

Twenty-first Day of May 1985

[SEAL]

Attest:

DONALD J. QUIGG

Attesting Officer     Acting Commissioner of Patents and Trademarks